J. G. Pusey,
Carving Wood,
No. 2,413
Reissued Dec. 4, 1866.
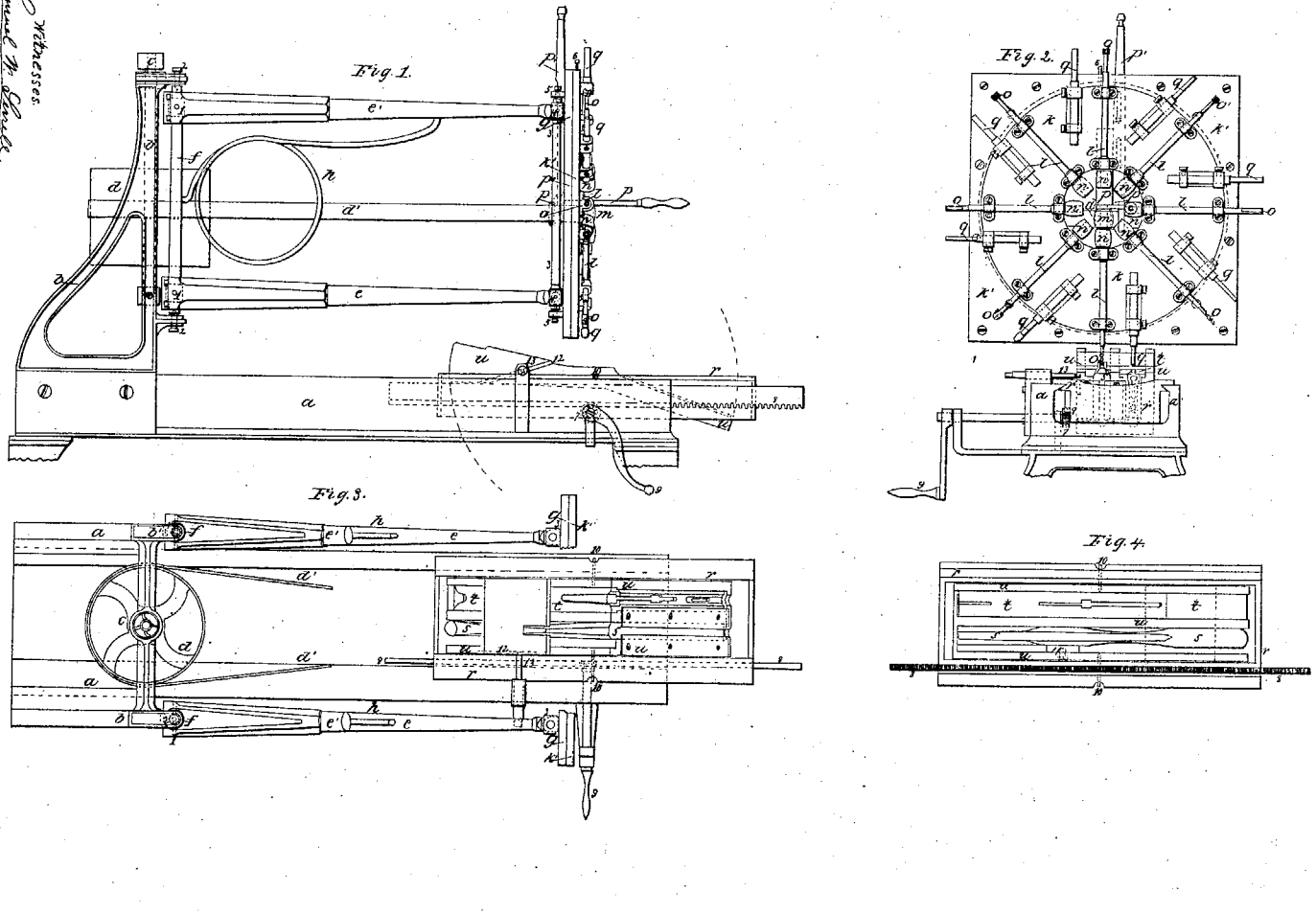
Witnesses.
Lemuel W. Serrell.
Thos. Stewart Harvold.
Inventor
John G. Pusey
AM. PHOTO-LITHO. CO. N.Y. (OSBORNE'S PROCESS)

United States Patent Office.

IMPROVEMENT IN MACHINES FOR BORING AND DRILLING GUN STOCKS.

THE NEW YORK ENGRAVING AND CARVING COMPANY, ASSIGNEES BY MESNE ASSIGNMENTS OF JOHN G. PUSEY, OF NEW YORK, N. Y.

*Letters Patent No.* 37,705, *dated February* 17, 1863; *reissue No.* 2,413, *dated December* 4, 1866.

SPECIFICATION.

TO ALL WHOM IT MAY CONCERN:

Be it known that JOHN G. PUSEY, of the city, county, and State of New York, did invent, make, and use a certain new and useful Improvement in Carving and Drilling Machinery for Gun Stocks, &c.; and the following is declared to be a full, clear, and exact description of the said invention, reference being had to the annexed drawing, making part of this specification, wherein—

Figure 1 is a side elevation of the said machine.

Figure 2 is an end view.

Figure 3 is a plan, with part of the head of cutters removed; and

Figure 4 is an inverted plan of the holder for the pattern and gun stock.

Similar marks of reference designate the same parts.

The nature of the said invention consists in a reversible holder, carrying the pattern and gun stock or other article to be mortised, bored, or carved, so that the gun stock can be carved to receive the barrel, breech-tang, and other parts on the top of the stock, and then turned over with the pattern and slotted or inlet to receive the ramrod, the trigger-plate, guard, &c.; and in consequence of the metal pattern and gun stock being firmly held in the said reversible holder, the various slots must be exactly on line with each other in the gun stock, and there is no risk of the parts not coming exactly to place, because the present mode of detaching the stock after one side has been cut, and then cutting the other side at a separate operation, is dispensed with, and the stock is held in place until cut all around in one direction, either on the top and bottom sides of the stock, or on the right and left sides of the stock, according to the way it is introduced in the holder. This invention also relates to the mode of holding the cutters and guide in a parallel moving head that can be raised or lowered or moved to the right or left with little or no friction. A head is also provided for holding the cutters so as to present any particular one to the work to be performed, and the guide to the particular pattern that is followed in mortising, boring, or carving gun stocks or other articles.

In the drawing, *a* is the bed-plate of the machine; *b b* are vertical frames, carrying an upright shaft, *c*, with a pulley, *d*, driven by competent power; *e e e′ e′* are arms jointed at one end at 1 1 to the vertical shafts *f f*, that are sustained at their ends by the centre-screws 2 2 entering the ends of said shafts, or any other suitable bearing may be used. These arms, *e e′*, are parallel to each other, and their outer ends are connected by universal joints to the plate *g*, carrying the head of cutters. The said universal joints are formed by the ends of the arms entering mortises in the vertical shafts 3 3, and attached thereto, and moving on pins 4 4, while said shafts, 3 3, are attached to the plate *g* by centre-screws 5 5. It will now be understood that the plate *g* can be moved across the bed *a*, or be raised up or down, and that the arms *e e e′ e′* preserve the same parallel to its normal position, and that there is but little friction in moving the plate *g* and the cutter and guide in either direction. The weight of these arms and plate, and parts carried by them, is sustained by springs *h h*, or counterbalance weights might be provided, if desired. This plate *g* carries a circular head *k* of cutting or carving tools. This circular plate *k* has a flanged edge kept to the plate *g* by the overhanging edges of the plates *k′*, which, however, allow this plate *k* to be revolved either by hand or by power, and stopped at any desired point. There is represented a pin, 6, to be pressed into a hole in the edge of this plate *k*, to retain the same in position when turned to bring any of the particular cutters into place for action. On this circular head *k* are mounted any desired number of radiating stocks, *l l*, carrying cutters or tools *o o*. There are shown eight such stocks and tools, but the number might be greater or less. The interior of the head *k* is open, and in this the pulleys *n n* of the respective stocks stand. *m* is a pulley set on an arbor or gudgeon attached to the bar *p* that is affixed to the back of the plate *g*, and *p′* is a slide and fork by which the belt *d′*, from the pulley *d*, can be slipped off of *m* on one of the pulleys *n*, or the reverse. When the said belt is running on the pulley *m*, the circular head *k*, cutter, stocks, and pulleys can be revolved, and when the particular tool required is brought vertically below *m*, the pin 6 is slipped in to hold the circular plate *k*, and then the belt *d′* slipped down upon the pulley below it to drive the cutter connected to said pulley, while all the other pulleys are stationary. By the side of each tool is a tracer, *q*, of the size and shape of the tool in its revolution, so that said tracer applied to the pattern to be worked from, regulates the action of the tool in the usual manner. The bar *p* is extended out and terminates with a handle vertically above the tracer *q*, and the operator, by this handle, causes the tracer to follow the pattern as he moves the entire head of cutters up or down or crosswise of the bed *a*; and by giving to the article to be operated upon, together with the pattern, an end motion along the bed *a*, the whole surface of the article to be slotted, mortised, or carved, can be brought to the action of the cutters, and one cutter can be carried out of action, and another brought into position very speedily; thereby any usual cutter that may from time to time be required for particular work can be brought into action, and the cumbersome arrangement heretofore in use of a double slide to each cutter stock is avoided. In place of the pulleys *n n*, a clutch might be provided near the end of *l*, and the pulley *m* might have a slight play, so as to connect with said clutch on *l*, and rotate the stock and tool attached. It will be evident that the freedom with which the whole cutter-head moves on and with the parallel arms *e e e′ e′*, greatly facilitates the carving or cutting operations, because the attendant can cause the tracer to follow the pattern much more easily than the same movements could be obtained if the cutter-head were mounted on a double slide on a stationary frame. The cutter and tracer are free to move transversely or vertically with but little friction, and hence can be moved to follow the most delicate pattern, and in all positions the cutter and tracer occupy the same position relatively to the pattern and the article being carved. In order to present the article to be carved, bored, or mortised, to the tool, a frame *r* is made use of, fitted to slide on the bed-plate *a*, and the same is to be moved by the pinion 7 taking the rack 8; said pinion being turned by the crank 9, or any other suitable device. Within this frame *r* the pattern is held, and also the piece of wood to be operated upon. In the drawing a gun stock *s* and pattern *t* are shown. These are to be of any desired size and character, and the pattern *t* is to be of metal, with all the mortises, grooves, &c., required for receiving the parts of the gun as usual. This metal pattern is held in the holder frame *u* that is attached by the centre pins 10 10 to the frame *r*. This holder frame *u* is constructed to fit the opening in the frame *r* so as to be steady therein; but it can be swung entirely over, or rotated on the said pins 10 10. In this holder frame the gun stock *s* is introduced in the proper position relatively to the pattern *t*, and clamped firmly in place by a screw at 11, or any other convenient mechanism whereby said stock is rigidly secured in place. The distance between the centres of the stock and pattern is to be the same as that between the cutter or tool *o* and the tracer *q*. It will now be seen that the upper side of the stock can be carved or inlet corresponding to the pattern by bringing the proper tools into action, and then the stock and pattern can be reversed with the holder *u*, and the parts cut out on the under side of the stock, and by these means the stock and pattern must correspond exactly, because their relative position is not disturbed until all the mortises, holes, &c., are formed, both above and below the stock. In cutting along the curved part of the stock to receive the breech-tang, or in cutting to receive the guard and trigger-plate on the curved under side of the stock, the said surface is to be kept at right angles to the axis of the cutting tool (in order that said tool may leave the inlet surface smooth and even) by turning the holder frame on its centres 10 10 as the cutting progresses. This may be done by a slot 12 in the side of the holder *u* receiving a stationary pin 13, which turns the said holder *u*, stock *s*, and pattern *t*, as the frame *r* is moved along the bed *a*. It will, however, be apparent that a link connected to a fixed point might be employed to give the same movement. For mortising the side of the stock to receive the lock-plate and other parts, both the stock and pattern have to be entered at right angles to their present position. In this machine the pattern and article to be carved are connected together, and revolved or turned over in planes parallel to each other, and at right angles to the trunnions or centres.

The mounting the gun stock upon centres or bearings at or near its ends is not claimed; neither is a series of tools fitted to move in slides, and brought into action successively.

What is claimed, and to be secured by Letters Patent, is—

1. Arranging a series of tool stocks to radiate from a common centre, in combination with a series of tracers, substantially as specified, whereby all the tools and tracers may be moved together in mortising, boring, or carving, but the tools not in use will, by their divergence, be out of the way, as set forth.

2. The arrangement of the pulley *m* in the middle of the circular head *k* and of the fork *p′*, or its equivalent, for receiving and changing the belt *d′*, in the manner set forth.

3. The parallel bars, *e e′*, each jointed at one end by a universal joint to a fixed support, and at the other end to a movable head, in combination with a cutter and a guide or tracer, substantially as specified, whereby the said cutter and tracer may be freely moved in carving, substantially as set forth.

4. The frame *u*, on centres 10, at right angles, or nearly so, to its length, and receiving the pattern and gun stock, or other article, substantially as specified, whereby the pattern and article to be acted upon can be reversed, to present either side to the tool and tracer, as set forth.

5. A holder fitted on centres, and carrying the pattern and gun stock or other article, and arranged substantially as specified to swing on said centres, while the tool is inletting or cutting the curved parts, in order that said tool may act at right angles to the surface, for the purposes and as specified.

6. Rotating the pattern and the article to be carved in parallel planes at right angles to the axis on which they are supported, substantially as and for the purposes set forth.

E. P. BRAY,
*President.*

Witnesses:
CHAS. H. SMITH,
GEO. D. WALKER.